United States Patent
Ross et al.

(10) Patent No.: US 6,917,799 B2
(45) Date of Patent: Jul. 12, 2005

(54) WIRELESS PUSH-TO-TALK INTERNET BROADCAST

(75) Inventors: David J. Ross, Del Mar, CA (US); Arnold J. Gum, San Diego, CA (US); Paul E. Jacobs, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 623 days.

(21) Appl. No.: 09/991,511

(22) Filed: Nov. 16, 2001

(65) Prior Publication Data

US 2002/0039895 A1 Apr. 4, 2002

Related U.S. Application Data

(63) Continuation of application No. 09/365,964, filed on Aug. 2, 1999.
(60) Provisional application No. 60/122,629, filed on Mar. 3, 1999, and provisional application No. 60/119,195, filed on Feb. 5, 1999.

(51) Int. Cl.[7] .............................................. H04M 11/00
(52) U.S. Cl. .................... 455/414.1; 455/518; 455/416; 370/338
(58) Field of Search ................................ 455/403, 412, 455/414, 416, 466, 422, 518, 562, 556, 557; 370/338, 401, 441

(56) References Cited

U.S. PATENT DOCUMENTS

| 5,987,102 A | * | 11/1999 | Elliott et al. ............. 379/93.17 |
| 6,021,326 A | * | 2/2000 | Nguyen ....................... 455/507 |
| 6,295,284 B1 | * | 9/2001 | Maggenti .................... 370/328 |

* cited by examiner

*Primary Examiner*—Sonny Trinh
*Assistant Examiner*—Sam Bhattacharya
(74) *Attorney, Agent, or Firm*—Philip R. Wadsworth; Robert J. O'Connell; John L. Ciccozzi

(57) ABSTRACT

A wireless telephone (302) digitizes the voice of the user in response to the depression of a push-to-talk button (110), either physical or virtual. It sends the digitized voice, in data mode, to a base station (308). The base station places the data, through the Internet, or an Intranet or Extranet, on a server (312). Other wireless phones (304)–(306) recover the data from the server through the same (308) or different (310) base station, through the Internet, Intranet, or Extranet, and convert the data back to digitized voice. The base stations transmit the digitized voice to other wireless telephones (306), which convert them back to voice in response to the recognition of voice frames on the data channel by the CODEC manager software. Networked computers (314) may be configured to emulate a combined base station and wireless telephone. The server can dynamically designate any wireless telephone (or landline emulation) as the broadcaster, and can dynamically configure any set of telephones/emulations as the receivers of the broadcast.

2 Claims, 6 Drawing Sheets

WIRELESS PUSH-TO-TALK INTERNET BROADCAST

CROSS-REFERENCE TO RELATED APPLICATIONS

This application is a continuation of U.S. patent application Ser. No. 09/365,964, filed Aug. 2, 1999, which claims the benefit of Provisional Application No. 60/119,195, filed Feb. 5, 1999 and Provisional Application No. 60/122,629, filed Mar. 3, 1999. These patent applications are incorporated herein by reference in their entirety.

TECHNICAL FIELD

This invention relates to wireless communications, and has particular relation to broadcasting voice to or from a wireless telephone over the Internet, or an Intranet or Extranet.

BACKGROUND ART

The conventional push-to-talk (PTT) communications system has several transceivers, all tuned to the same channel, namely, the same frequency. Any user who wishes to speak pushes a button on his microphone, causing the transceiver to transmit. Releasing the button causes the transceiver to receive. Any number of users may share the same frequency, provided that there is some way to determine which user is next allowed to transmit.

Trunked radio is a step up from this technology. Instead of sharing a common physical channel, the users share a common logical channel. A user who wishes to start a conversation broadcasts a signal requesting such a start. A controller receives this signal. The controller broadcasts back a signal which allocates a physical channel—a signal which every other user can receive as well. All users then re-tune to the allocated frequency, and the conversation continues as before. Whenever there is a pause in the conversation, the controller can broadcast a new physical channel allocation. Such re-allocation may be required by traffic patterns, signal quality, and the like.

"Trunked" radio gets its name from telephone trunk lines between distant cities. A telephone user in one city may regularly place a call, every day, to another user in the other city. When he does, he places it on a local loop to his local telephone company office, which places it on a trunk to the telephone company office in the other city, which places it on a local loop to the second user. There is no expectation that the same inter-city trunk will be assigned every day. Indeed, the telephone company may change the trunk in the middle of the call (presumably during a pause), without changing either of the local loops.

Trunked radio works as well (or as poorly) in a conference call (more than two users) as it does in a regular call (two users). The controller can do more that just allocate the physical channel. It can also arbitrate which user is next allowed to broadcast. It can alert a pre-selected group of users that a broadcast is being made to them. What it can't do, however, is dynamically change the composition of the group, or give the group geographic coverage driven by the availability of the Internet, or an Intranet or Extranet.

BRIEF DISCLOSURE OF THE INVENTION

Applicants have overcome this limitation by combining wireless telephone service with the Internet, or an Intranet or Extranet. A wireless telephone digitizes the voice of the user in response to the depression of a push-to-talk button, either physical or virtual. It sends the digitized voice, in data mode, to a base station. The base station places the data, through the Internet, or an Intranet or Extranet, on a server. Other wireless telephones recover the data from the server through the Internet, or an Intranet or Extranet, and convert the data back to digitized voice. Networked computers may also be configured to emulate a combined base station and wireless telephone. The server can dynamically designate any wireless telephone (or landline emulation) as the broadcaster, and can dynamically configure any set of telephones/emulations as the receivers of the broadcast.

DETAILED DESCRIPTION OF THE PREFERRED EMBODIMENT

Figure 1:
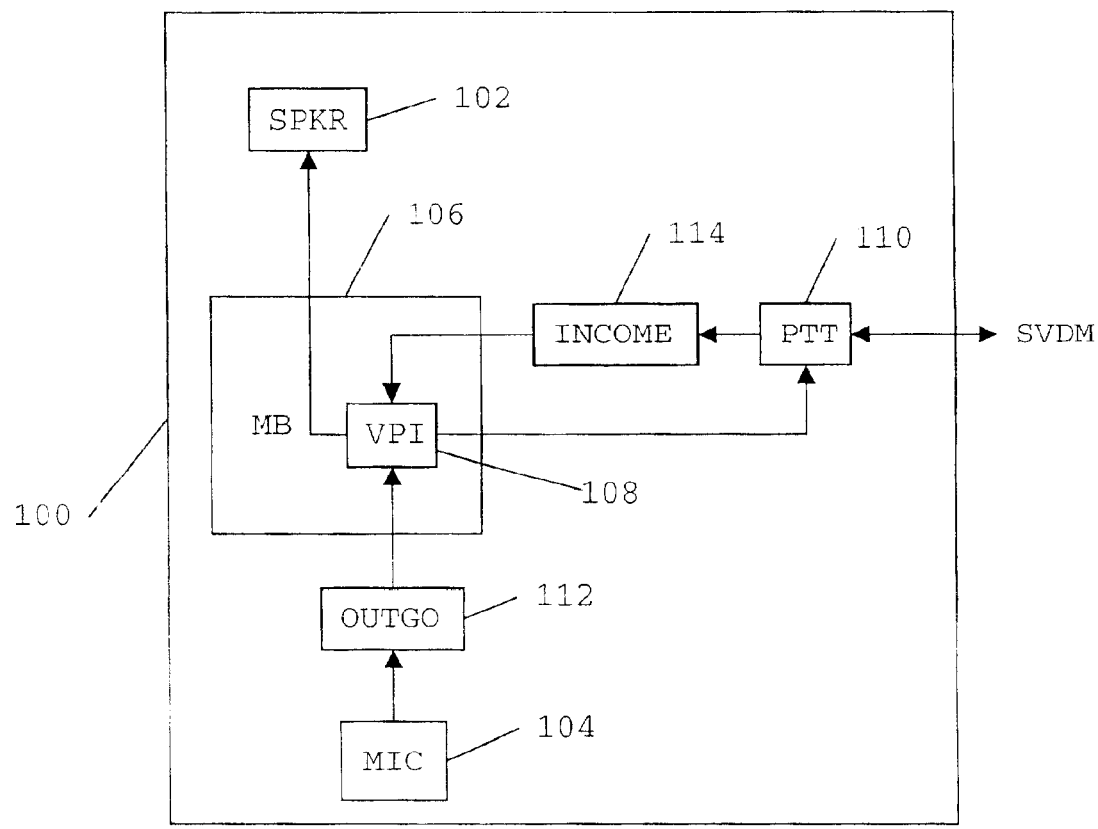
FIG. 1 is a block diagram of a wireless telephone (100) according to the present invention.

FIG. 1 is a block diagram of a wireless telephone (100) according to the present invention. The wireless telephone includes a speaker (102), a microphone (104), a micro-browser or micro-client software (106) having an Internet, Intranet, or Extranet address, a voice CODEC manager software (108) to the micro-browser or micro-client software, and a real or virtual push-to-talk (PTT) button (110). It also includes means (112) for sending an outgoing streaming voice data message (SVDM) from the microphone through the voice CODEC manager software, and an indication that the PTT button has been depressed, in response to a depression of the PTT button. It further includes means (114) for sending an incoming streaming voice data message through the voice CODEC manager software to the speaker, in response to a release of the PTT button.

Figure 2:
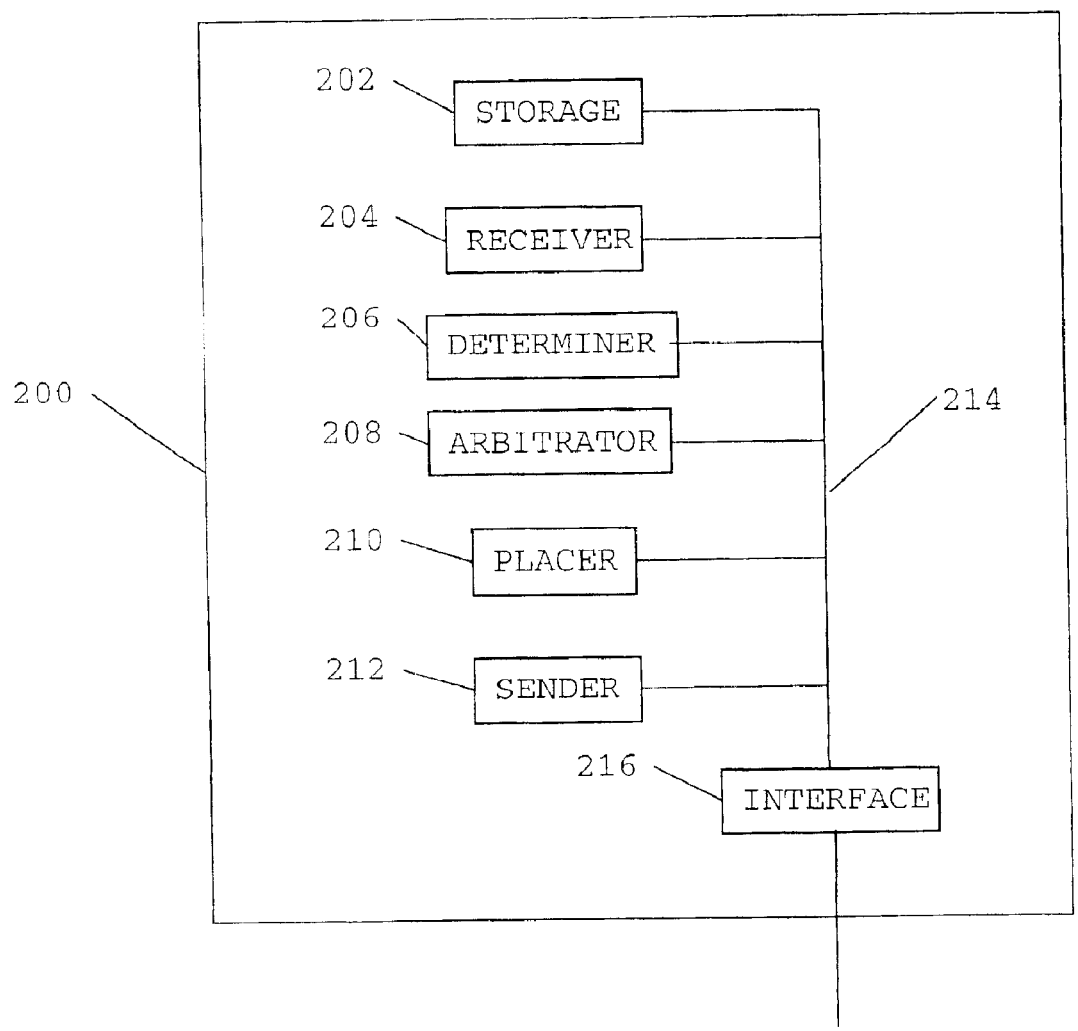
FIG. 2 is a block diagram of an Internet, Intranet, or Extranet server (200) according to the present invention.

FIG. 2 is a block diagram of an Internet, Intranet, or Extranet server (200) according to the present invention. The Internet, Intranet, or Extranet server includes means for storing (202) a plurality of Internet, Intranet, or Extranet addresses. This storage means can accept address additions and deletions both during a call and when no call is taking place. It thus provides the ability to dynamically group wireless telephones into conferences. Networked computers (314; see FIG. 3) may substitute for some wireless telephones.

The server (200) also includes means for receiving (204) an indication that a push-to-talk (PTT) button has been depressed at a wireless telephone at each Internet, Intranet, or Extranet address. It also includes means for determining (206) whether more than one wireless telephone has a depressed PTT button indication, and means, responsive to more than one wireless telephone having a depressed PTT button indication, for arbitrating (208) which wireless telephone is allowed to place a streaming voice data message on the server. Once the arbitrated wireless telephone (or the sole wireless telephone, if only one has a depressed PTT button) has been selected, the server includes means for placing (210) a streaming voice data message on the server from the arbitrated wireless telephone or from the sole wireless telephone. It also includes means for sending (212) the placed data to the wireless telephones at the other Internet, Intranet, or Extranet addresses. FIG. 2 shows these components as connected by a bus (214) connected to an interface (216), but any convenient architecture may be used.

Figure 3:
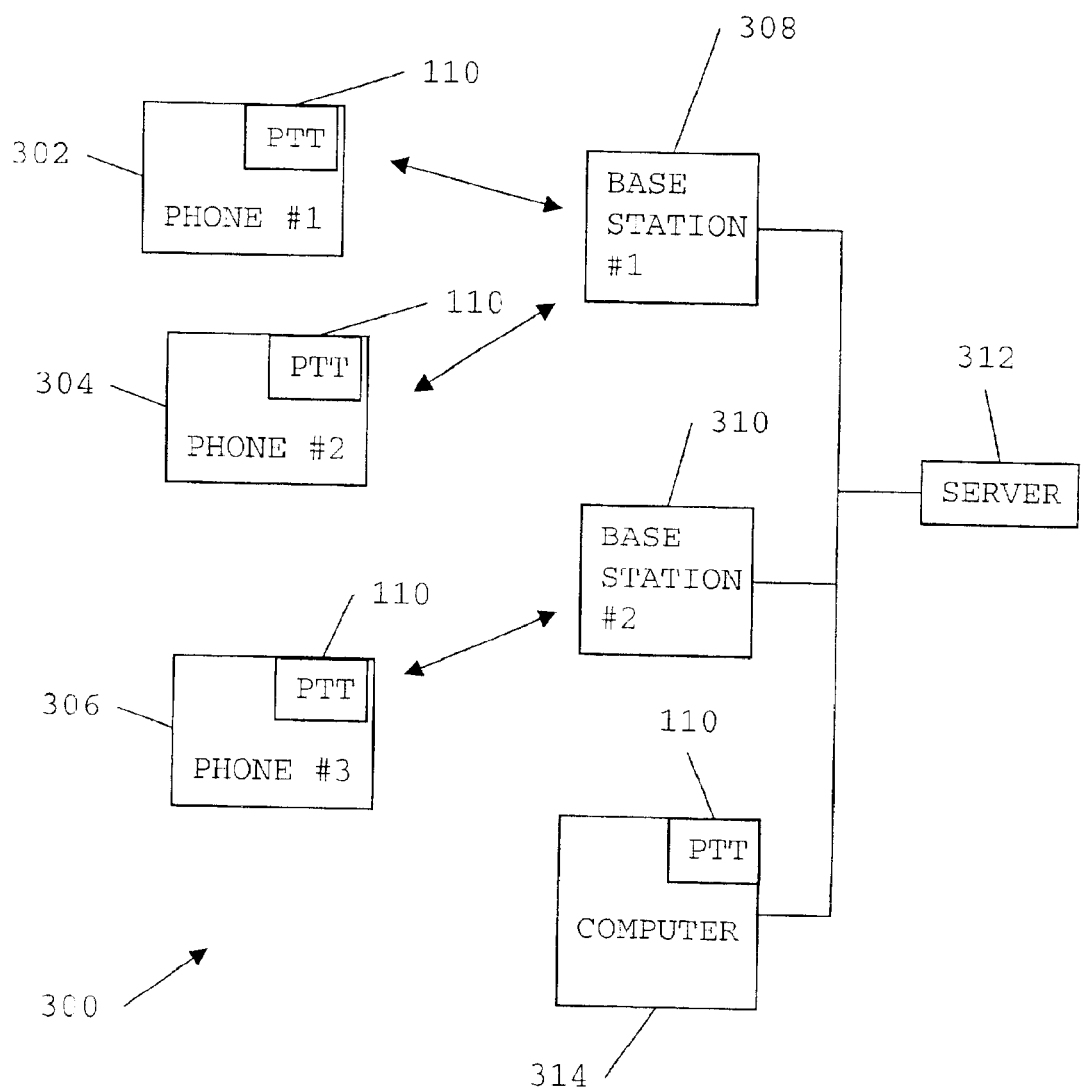
FIG. 3 is a block diagram of a system (300) according to the present invention.

FIG. 3 is a block diagram of a system (300) according to the present invention. The system includes a first wireless telephone (302), a second wireless telephone (304 or 306), a first base station (308), a second base station (310), and an Internet, Intranet, or Extranet server (312). Each wireless telephone is as described in FIG. 1. The first wireless telephone is in wireless communication with a first base station, and the first base station is in communication, through the Internet, or an Intranet or Extranet, with the Internet, Intranet, or Extranet server. A direct connection is shown for simplicity. In practice, several routers (and perhaps other devices) would be included in the connection. The second wireless telephone is in wireless communication with a second base station, and the second base station is also in communication, through the Internet, or an Intranet or Extranet, with the Internet, Intranet, or Extranet server. The Internet, Intranet, or Extranet server is as described in FIG. 2. The first base station may be the same as the second base station (the second wireless telephone is Phone #2 (304)), or different from the second base station (the second wireless telephone is Phone #3 (306)).

The Internet, Intranet, or Extranet server may be configured to add or remove the Internet, Intranet, or Extranet address of a wireless telephone on request from that wireless telephone, from a device other than that wireless telephone, or both. The Internet, Intranet, or Extranet server may be configured, on request from a wireless telephone, to store one or more streaming voice data messages and to forward them to the wireless telephone on subsequent request. The system may further include at least one additional device, which is not a wireless telephone, but which has been constructed, and has been connected to the Internet, Intranet, or Extranet server, so as to emulate a wireless telephone. This device is preferably a computer (314), with microphone and speaker, loaded with appropriate software. In this case, the store-and-forward mechanism may be as simple as displaying an icon or avatar on the screen, representing the user of a particular telephone or computer. Clicking on this icon forwards all messages from that remote user, or allows particular messages to be selected. Careful use of this feature allows the user to select particular remote users who are deemed to be especially important, and to filter out especially unimportant remote users.

Figure 4:
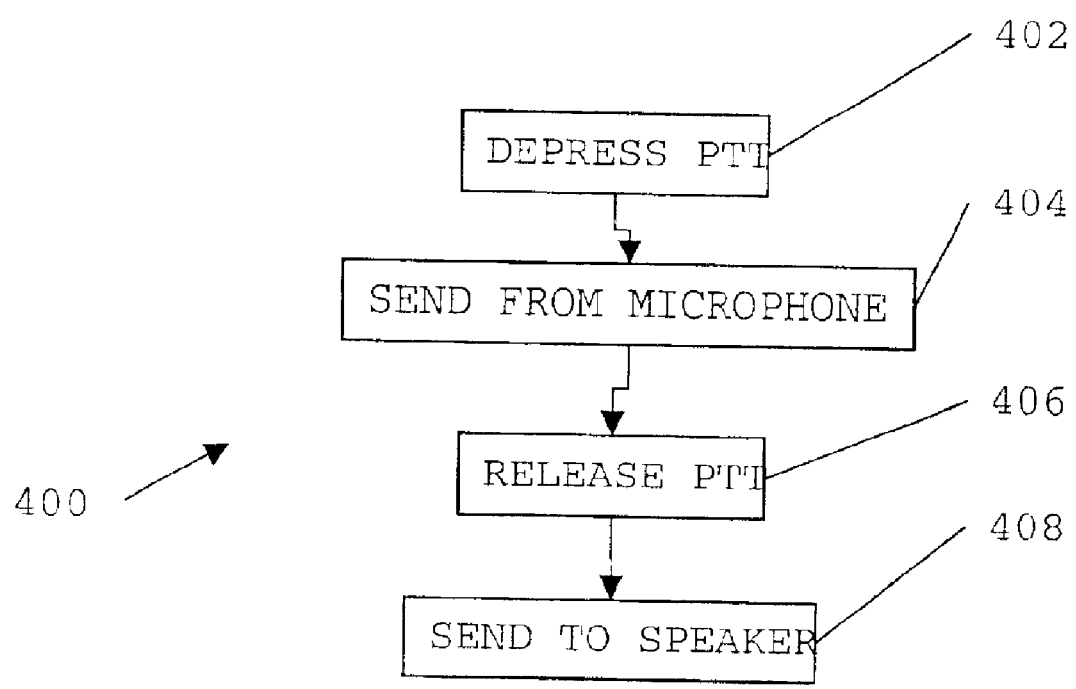
FIG. 4 is a flowchart of a method (400) for operating the wireless telephone of FIG. 1.

FIG. 4 is a flowchart of a method (400) for operating the wireless telephone of FIG. 1. The method includes depressing (402) the PTT button and sending (404) an outgoing streaming voice data message from the microphone through the voice CODEC manager software (and an indication that the PTT button has been depressed) in response to a depression of the PTT button. It further includes releasing (406) the PTT button and sending (408) an incoming streaming voice data message through the voice CODEC manager software to the speaker, in response to a release of the PTT button.

Figure 5:
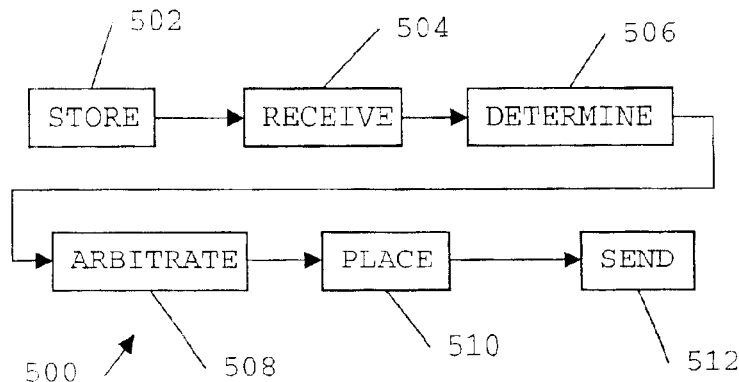
FIG. 5 is a flowchart of a method (500) for operating the Internet, Intranet, or Extranet server of FIG. 2.

FIG. 5 is a flowchart of a method (500) for operating the Internet, Intranet, or Extranet server of FIG. 2. The method includes storing (502) a plurality of Internet, Intranet, or Extranet addresses, receiving (504) an indication that a push-to-talk (PTT) button has been depressed at a wireless telephone at each Internet, Intranet, or Extranet address, and determining (506) whether more than one wireless telephone has a depressed PTT button indication. If more than one wireless telephone has a depressed PTT button indication, the method further includes arbitrating (508) which wireless telephone is allowed to place a streaming voice data message on the server, and placing (510) a streaming voice data message on the server from the arbitrated wireless telephone. If only one had a depressed PTT button, then it includes placing the message from that sole wireless telephone. It finally includes sending (512) the placed streaming voice data message to the wireless telephones at the other Internet, Intranet, or Extranet addresses.

Figure 6:
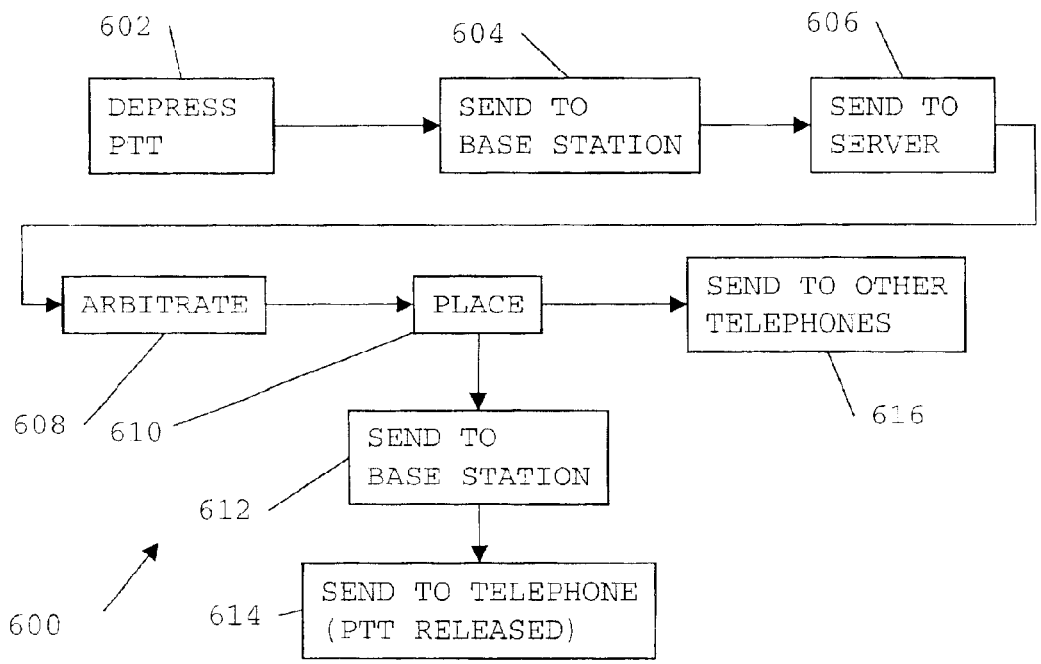
FIG. 6 is a flowchart of a method (600) for operating the system of FIG. 3.

FIG. 6 is a flowchart of a method (600) for operating the system of FIG. 3. The PTT button on the first wireless telephone is depressed 602). The first wireless telephone sends (604) an outgoing streaming voice data message from the microphone through the voice CODEC manager software (and an indication that the PTT button has been depressed) in response to a depression of the PTT button, to the first base station. The first base station sends (606) an indication to the Internet, Intranet, or Extranet server that the PTT button has been depressed at the first wireless telephone. The Internet, Intranet, or Extranet server arbitrates (608), if more than one wireless telephone has a depressed PTT button indication, which wireless telephone is allowed to place a streaming voice data message on the server. The streaming voice data message is placed (610) on the server from the arbitrated wireless telephone or from a sole wireless telephone. The server sends (612) the placed streaming voice data message to the second wireless telephone through the second base station. The second wireless telephone sends the placed streaming voice data message through the voice CODEC manager software, in response to a release of the PTT button (614), to the speaker. The server sends (616) the placed streaming voice data message to the wireless telephones at the other Internet, Intranet, or Extranet addresses, if any.

As before, the first base station may be the same as the second base station, or different from the second base station.

Figure 7:
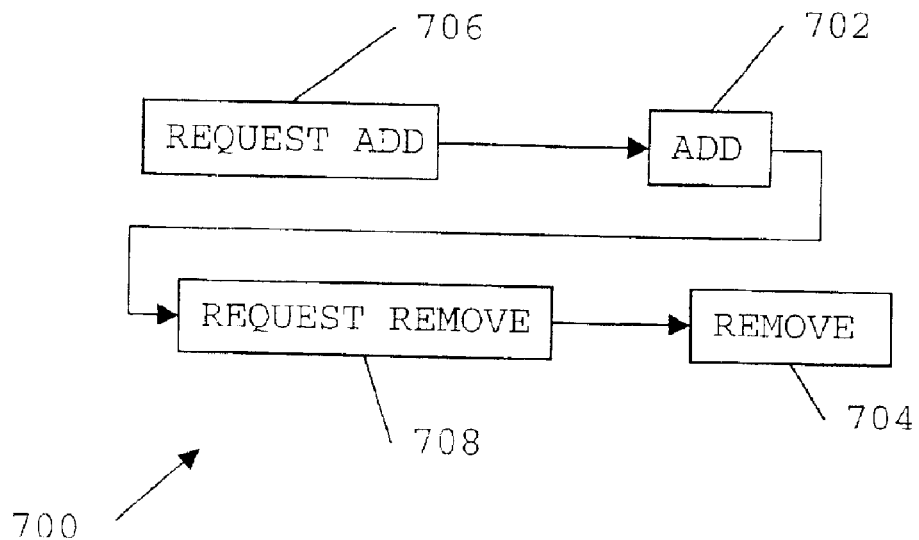
FIG. 7 is a flowchart of a method (700) for configuring the system of FIG. 3.

FIG. 7 is a flowchart of a method (700) for configuring the system of FIG. 3. The Internet, Intranet, or Extranet server may be configured to add (702) or remove (704) the Internet, Intranet, or Extranet address of a wireless telephone on request (706 or 708) from that wireless telephone, from a device other than that wireless telephone, or both.

Figure 8:
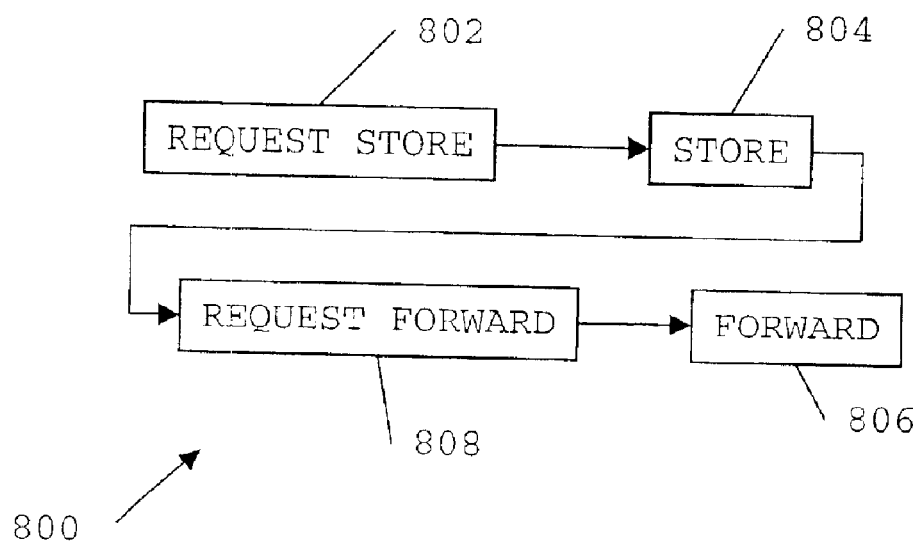
FIG. 8 is a flowchart of a store-and-forward method (800) using the system of FIG. 3.

FIG. 8 is a flowchart of a store-and-forward method (800) using the system of FIG. 3. The method may include, on request (802) from a wireless telephone, storing (804) one or more streaming voice data messages and forwarding (806) them to the wireless telephone on subsequent request (808).

INDUSTRIAL APPLICATION

Our invention is capable of exploitation in industry, and can be made and used, whenever is it desired to broadcast to or from a wireless telephone via the Internet, or an Intranet or Extranet. The individual components of the apparatus and method shown herein, taken separate and apart from one another, may be entirely conventional, it being their combination which we claim as our invention.

While we have described various modes of apparatus and method, the true spirit and scope of my invention are not limited thereto, but are limited only by the following claims and their equivalents, and we claim such as our invention.

What is claimed is:

1. A wireless telephone, wherein:
   (a) the wireless telephone includes:
      (1) a speaker; and
      (2) a microphone; and
   (b) the wireless telephone is characterized in that it includes:
      (1) a micro-browser or micro-client software having an Internet, Intranet, or Extranet address;
      (2) a voice CODEC manager software to the micro-browser or micro-client software;
      (3) a real or virtual push-to-talk (PTT) button;
      (4) means for sending:
         (A) an outgoing streaming voice data message from the microphone through the voice CODEC manager software; and
         (B) an indication that the PTT button has been depressed;
      in response to a depression of the PTT button;
      (5) means for sending an incoming streaming voice data message through the voice CODEC manager software to the speaker, in response to a release of the PTT button
      (6) means for receiving an indication that a PTT button has been depressed at a wireless telephone at each Internet, Intranet, or Extranet address;
      (7) means for determining whether more than one wireless telephone has a depressed PTT button indication;
      (8) means for arbitrating which wireless telephone is allowed to place a streaming voice data message on a server;
      (9) means for selecting an arbitrated wireless telephone;
      (10) means for placing a streaming voice data message on the server from the arbitrated wireless telephone; and
      (11) means for sending the placed streaming voice data message to wireless telephones at the Intranet, Internet, or Extranet address.

2. A method for operating a wireless telephone, wherein:
   (a) the wireless telephone includes:
      (1) a speaker; and
      (2) a microphone;
   (b) the wireless telephone is characterized in that it includes:
      (1) a micro-browser or micro-client software having an Internet, Intranet, or Extranet address;
      (2) a voice CODEC manager software to the micro-browser or micro-client software; and
      (3) a real or virtual push-to-talk (PTT) button; and
   (c) the method is characterized in that it includes:
      (1) depressing the PTT button;
      (2) sending:
         (A) an outgoing streaming voice data message from the microphone through the voice CODEC manager software; and
         (B) an indication that the PTT button had been depressed;
      in response to a depression of the PTT button;
      (3) releasing the PTT button;
      (4) sending an incoming streaming voice data message through the voice CODEC manager software to the speaker, in response to a release of the PTT button;
      (5) receiving an indication that a PTT button has been depressed at a wireless telephone at each Internet, Intranet, or Extranet address;
      (6) determining whether more than one wireless telephone has a depressed PTT button indication;
      (7) arbitrating which wireless telephone is allowed to place a streaming voice data message on a server;
      (8) selecting an arbitrated wireless telephone;
      (9) placing a streaming voice data message on the server from the arbitrated wireless telephone; and
      (10) sending the placed streaming voice data message to wireless telephones at the Intranet, Internet, or Extranet address.

* * * * *